(12) United States Patent
Blough et al.

(10) Patent No.: US 9,523,394 B2
(45) Date of Patent: Dec. 20, 2016

(54) CLUTCH PLATE WITH SIMULATED FRICTION MATERIAL SEGMENTS

(71) Applicant: Schaeffler Technologies GmbH & Co. KG, Herzogenaurach (DE)

(72) Inventors: Gregory Blough, Wooster, OH (US); Jed Acker, Shreve, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 60 days.

(21) Appl. No.: 14/518,113

(22) Filed: Oct. 20, 2014

(65) Prior Publication Data

US 2015/0107951 A1 Apr. 23, 2015

Related U.S. Application Data

(60) Provisional application No. 61/894,798, filed on Oct. 23, 2013.

(51) Int. Cl.
*F16D 13/64* (2006.01)
*F16H 45/02* (2006.01)
*F16D 69/00* (2006.01)

(52) U.S. Cl.
CPC ............. *F16D 13/64* (2013.01); *F16D 13/644* (2013.01); *F16H 45/02* (2013.01); *F16D 2069/004* (2013.01); *F16H 2045/0278* (2013.01); *F16H 2045/0289* (2013.01); *F16H 2045/0294* (2013.01); *Y10T 156/10* (2015.01)

(58) Field of Classification Search
CPC .. F16D 13/64; F16D 13/644; F16D 2069/004; F16H 45/02; F16H 2045/0273; F16H 2045/0289; F16H 2045/0294; Y10T 156/10

See application file for complete search history.

(56) References Cited

U.S. PATENT DOCUMENTS

| | | | | |
|---|---|---|---|---|
| 2,733,797 A | * | 2/1956 | Almen | F16D 67/00 192/107 R |
| 6,056,100 A | * | 5/2000 | Adamczak | F16D 69/02 192/107 M |
| 6,336,540 B1 | * | 1/2002 | Boule | F16D 23/025 192/107 M |
| 6,500,294 B1 | * | 12/2002 | Honda | F16D 69/0408 156/256 |
| 7,919,165 B2 | * | 4/2011 | Hasegawa | F16D 13/64 192/70.11 |
| 8,083,046 B2 | * | 12/2011 | Paterra | F16D 13/648 192/107 M |
| 2004/0050646 A1 | * | 3/2004 | Matthes | F16D 13/648 192/107 R |

(Continued)

*Primary Examiner* — Jacob S Scott
(74) *Attorney, Agent, or Firm* — Davidson, Davidson & Kappel, LLC

(57) ABSTRACT

A clutch plate for a torque converter is provided. The clutch plate includes a core plate and a friction material layer fixed to the core plate. The friction material layer includes an inner radial portion of a first thickness and an outer radial portion of a second thickness less than the first thickness. The friction material layer includes radially extending channels defined therein extending from an inner circumference of the inner radial portion to the outer radial portion. A method for forming a clutch plate is also provided.

20 Claims, 4 Drawing Sheets

(56) References Cited

U.S. PATENT DOCUMENTS

2007/0151822 A1* 7/2007 Toya .................. F16D 13/64
                                                    192/70.14
2009/0078527 A1* 3/2009 Mordukhovich ....... F16D 13/64
                                                    192/107 C

* cited by examiner

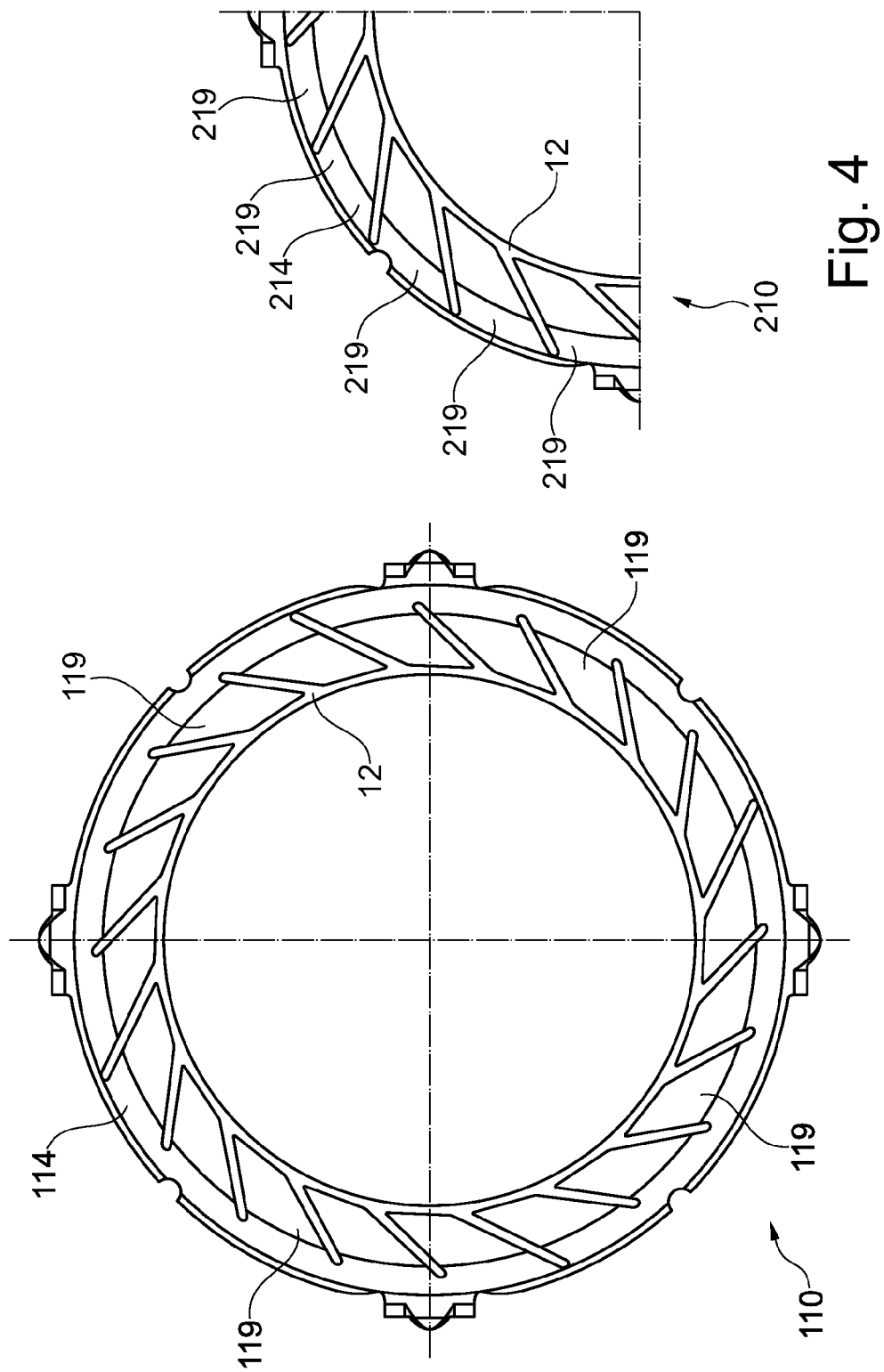

CLUTCH PLATE WITH SIMULATED FRICTION MATERIAL SEGMENTS

This claims the benefit to U.S. Provisional Patent Application No. 61/894,798, filed on Oct. 23, 2013, which is hereby incorporated by reference herein.

The present disclosure relates generally to torque converters and more specifically to clutch plates of torque converters.

BACKGROUND

It has been known to trim the full ring off of the outer circumference of friction material by a cutting process.

SUMMARY OF THE INVENTION

A clutch plate for a torque converter is provided. The clutch plate includes a core plate and a friction material layer fixed to the core plate. The friction material layer includes an inner radial portion of a first thickness and an outer radial portion of a second thickness less than the first thickness. The friction material layer includes radially extending channels defined therein extending from an inner circumference of the inner radial portion to the outer radial portion.

A method for forming a clutch plate is also provided. The method includes attaching a friction material layer to a core plate, the friction material layer including radially extending channels defined therein extending from an inner circumference of the friction material layer into the friction material layer; and compressing the friction material layer at outer radial ends of the channels.

BRIEF DESCRIPTION OF THE DRAWINGS

The present invention is described below by reference to the following drawings, in which:

FIG. 3 shows a plan view of clutch plate in accordance with a second embodiment of the present invention;

FIG. 4 shows a plan view of a quarter of clutch plate in accordance with a third embodiment of the present invention;

DETAILED DESCRIPTION

The present disclosure provides a method for manufacturing a clutch plate with channels extending into friction material segments. In order to make such a plate with existing equipment, a full ring of material with radially extending fingers is first bonded to the plate. Once bonded, the outer ring is compressed to create a flow path below the friction surface to the channels between the fingers.

Figure 2:
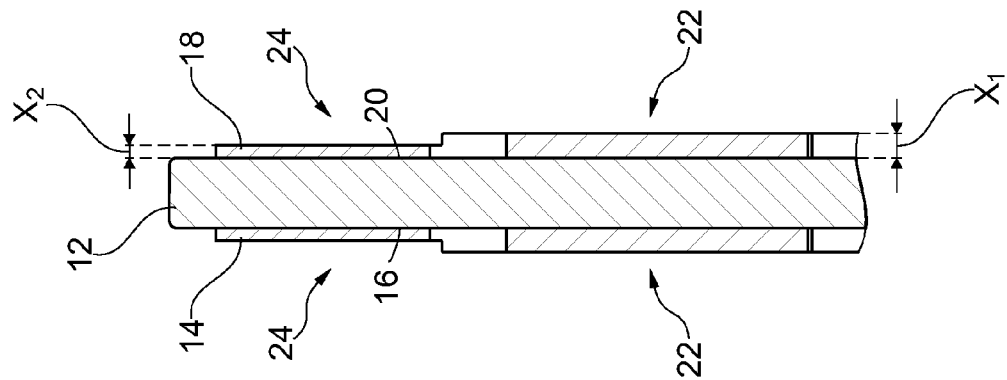
FIG. 2 shows a cross-sectional side view of clutch plate along A-A in FIG. 1.
Figure 1:
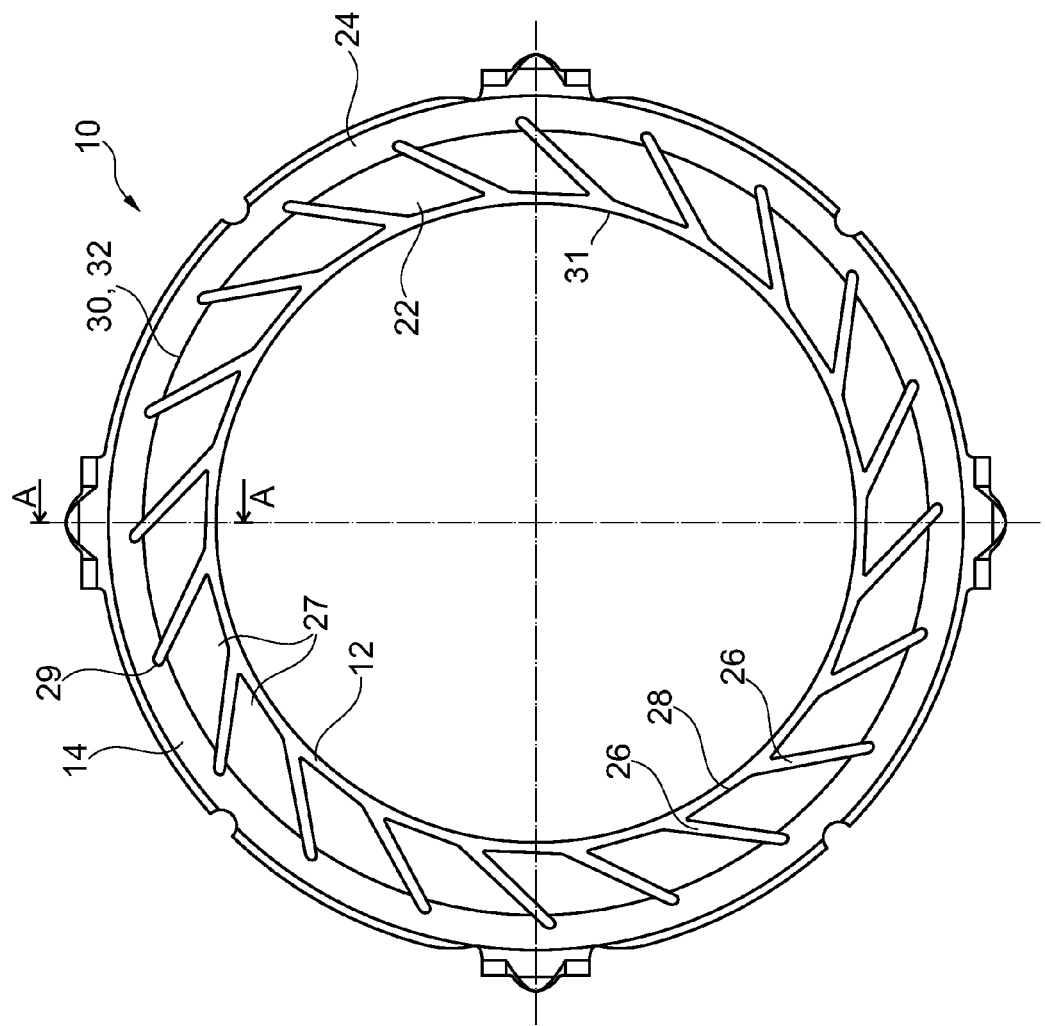
FIG. 1 shows a plan view of a clutch plate in accordance with a first embodiment of the present invention.

FIG. 1 shows a plan view of a clutch plate 10 in accordance with a first embodiment of the present invention and FIG. 2 shows a cross-sectional side view of clutch plate 10 along A-A in FIG. 1. Clutch plate 10 includes a ring-shaped core plate 12, which in this embodiment is made from metal, preferably stamped steel, with friction material attached to both sides thereof. In particular, core plate 12 includes a first friction material layer 14 attached to a first face 16 of core plate 12 and a second friction material layer 18 attached to a second face 20 of core plate 12 opposite of first face 16. In this embodiment, friction material layers 14, 18 are identical to each other (accordingly, any description of friction material layer 14 also applies to friction material layer 18) and are each formed of a single segment formed by a continuous ring.

In other embodiments, the friction material layers may each be formed of a plurality of friction material segments applied to each of faces 16, 20. FIG. 3 shows a plan view of clutch plate 110 in accordance with a second embodiment of the present invention. Clutch plate 110 includes a friction material layer 114 formed by four circumferentially spaced arc shaped frictional material segments 119 and an identical friction material layer on the other side of core plate 12. FIG. 4 shows a plan view of a quarter of clutch plate 210 in accordance with a third embodiment of the present invention. Clutch plate 210 includes a friction material layer 214 formed of twenty circumferentially spaced pad shaped frictional material segments 219 and an identical friction material layer on the other side of core plate 12.

Referring back to FIGS. 1 and 2, each friction material layer 14, 18 includes an inner radial portion 22 of a first thickness $X_1$ and an outer radial portion 24 of a second thickness $X_2$ less than first thickness $X_1$. Both inner radial portion 22 and outer radial portion 24 had the same initial thickness; however, outer radial portion 24 has been compressed in the axial direction to decrease the thickness thereof. Accordingly, outer radial portion 24 has a greater density than inner radial portion, which is a function of the ratio of thickness $X_1$ and $X_2$.

Friction material 14 includes a plurality of radially extending channels 26 defined therein extending from an inner circumference 28 of inner radial portion 22 to outer radial portion 24. Radially extending channels 26 separate friction material layer 14 into a plurality of fingers 27 that extend radially inward toward inner circumference 31 of core plate 12 and are joined together at in outer radial portion 24 at outer radial ends 29 of channels 26. Inner circumference 31 of core plate 12 is radially inside of inner circumference 28 of inner radial portion 22. Inner radial portion 22 and outer radial portion 24 are both substantially ring-shaped with interruptions formed therein by channels. Radially extending channels 26, which also extend in the circumferential direction, extend past an inner circumference 30 of outer radial portion 24, which is also an outer circumference 32 of inner radial portion 22, into outer radial portion 24. Channels 26 allow torque converter fluid to flow along core plate 12, which is not covered by friction material at channels 26, through friction material from inner circumference 28 of inner radial portion 22 to outer circumference 32 of inner radial portion 22.

Figure 5:
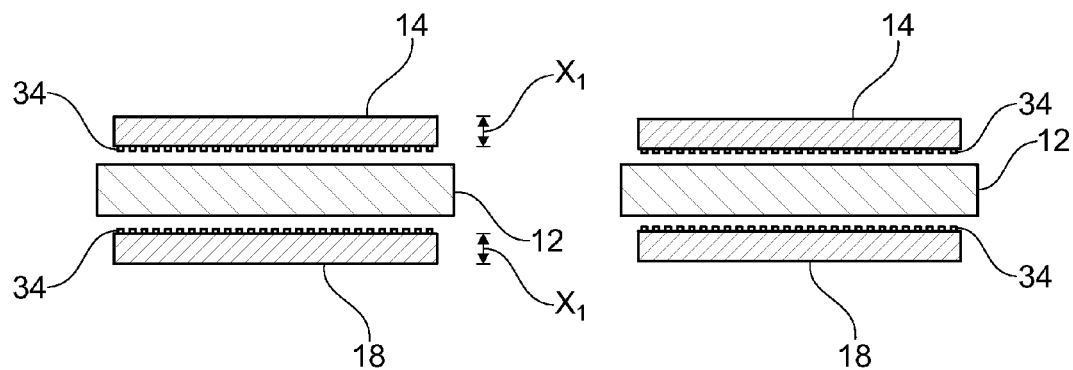
FIGS. 5 and 6 show a method of forming a clutch plate in accordance with an embodiment of the present invention.
Figure 6:
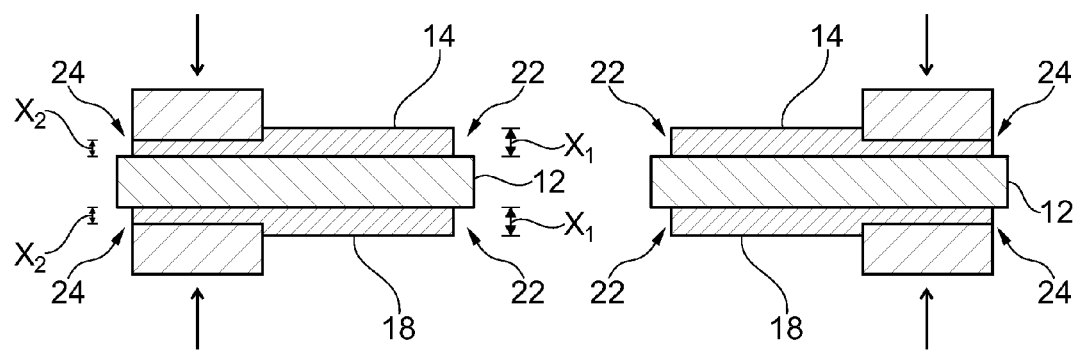

To form clutch plate 10, using a standard die cutting process, friction material layers are cut into two rings and channels 26 are cut into the rings to form friction material layers 14, 18. Next, friction material layers 14, 18 are attached to faces 16, 20, respectively, of core plate 10. In a preferred embodiment, friction material layers 14, 18 are attached to faces 16, 20 by adhesive bonding. Friction material layers 14, 18 may be compressed at outer radial portions 24 at the same time friction material layers 14, 18 are being bonded to core plate 12 by the adhesive. FIGS. 5 and 6 schematically show a cross-sectional view of an example of friction material layers 14, 18 being compressed during the bonding process. In FIG. 5, friction material layers 14, 18 both have a constant thickness $X_1$ through their lengths. Adhesive 34 is applied to friction material layers 14, 18 on the sides facing core plate 12. Then, as shown in FIG. 6, as or after friction material layers 14, 18 with adhesive 34 are pressed against core plate 12, two ring shaped dies 36, 38 are pressed against friction material layers 14, 18 at opposite sides of core plate 12 to compressed friction material layers 14, 18 at outer radial ends 29 of channels 26 (see FIGS. 1 to 4) to form outer radial portions 24 having a reduced thickness $X_2$, in comparison to inner radial portions 22, which maintain the initial thickness $X_1$. The compressing friction material layer 14, 16 at outer radial ends 29 of channels 26 allows channels 26 to define a fluid flow path from the inner circumference of friction material layers 14, 18 to the outer circumference of friction material layers. This same method of attachment and compression may be used for clutch plates 110, 210.

Figure 7:
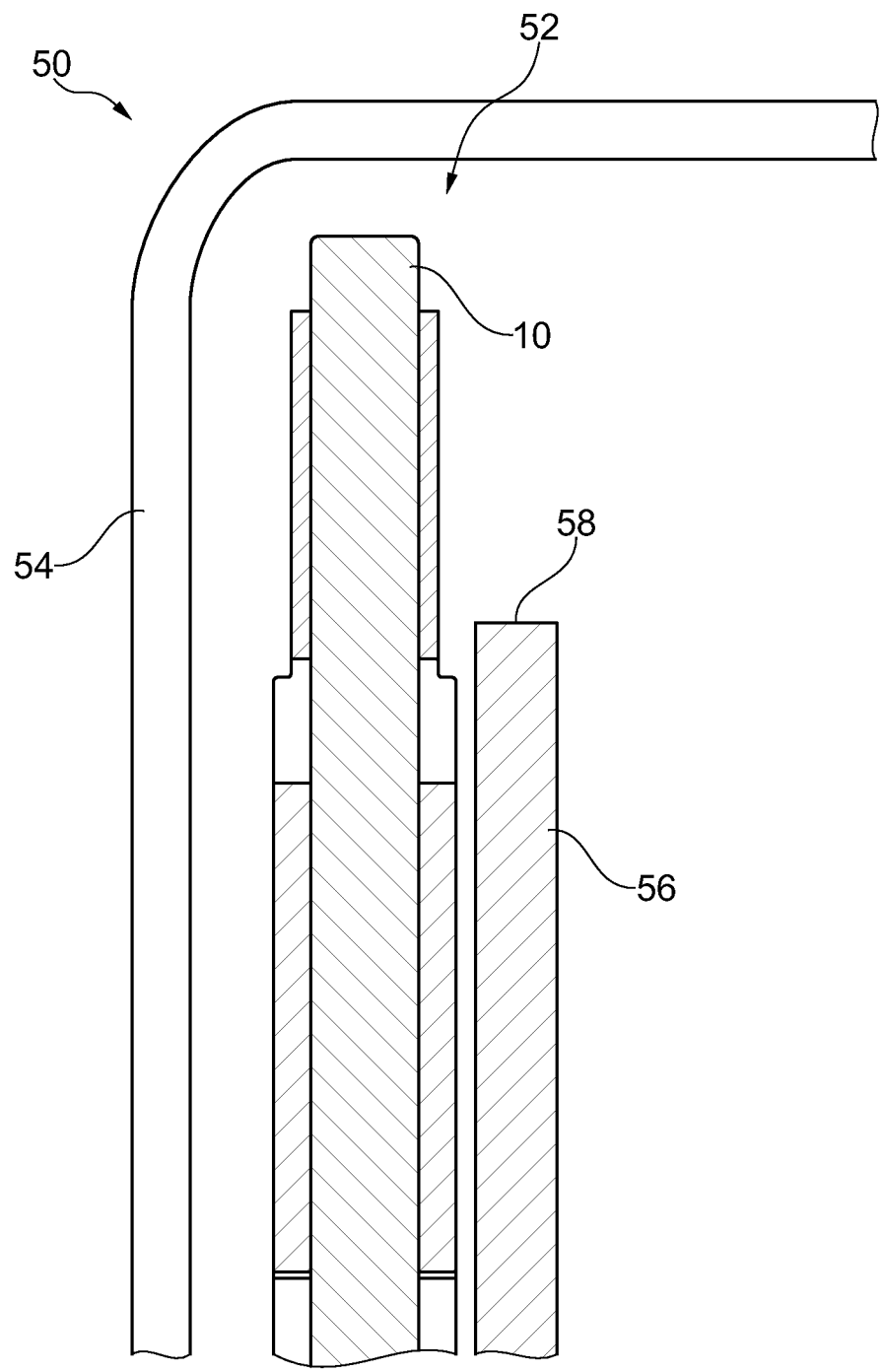
FIG. 7 shows a portion of a torque converter including the clutch plate shown in FIGS. 1 and 2 in a lockup clutch.

FIG. 7 shows a portion of a torque converter 50 including clutch plate 10 in a lockup clutch 52 inside of a front cover 54. A piston 56 presses against inner radial portion 22 of clutch plate 10. The compressing of outer radial portion 24 allows for clearance at edge 58 of piston 54 so edge 58 does not cut into friction material layer 18 as piston 54 is pressed against clutch plate 10 to engage clutch plate 10 with front cover 54.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A clutch plate comprising:
   a core plate; and
   a friction material layer fixed to the core plate, the friction material layer including an inner radial portion of a first thickness and an outer radial portion of a second thickness less than the first thickness, the friction material layer defining radially extending channels extending from an inner circumference of the inner radial portion to the outer radial portion, the friction material layer including a ring of segments of the inner radial portion interrupted by the radially extending channels, the core plate being uncovered by the friction material layer and being exposed at the radially extending channels, the outer radial portion being formed as a continuous ring with the segments of inner radial portion being integrally formed with the continuous ring and extending radially therefrom or the outer radial portion being formed as two or more segments with at least one of the segments of the inner radial portion being integrally formed with and extending radially inward from each of the segments of the outer radial portion.

2. The clutch plate as recited in claim 1 wherein the radially extending channels extend into the outer radial portion.

3. The clutch plate as recited in claim 1 wherein the radially extending channels also extend in the circumferential direction.

4. The clutch plate as recited in claim 1 wherein the outer radial portion is denser than the inner radial portion.

5. The clutch plate as recited in claim 4 wherein the outer radial portion had a same initial thickness as the inner radial portion and was further compressed.

6. The clutch plate as recited in claim 1 wherein an inner circumference of the core plate is radially inside of the inner circumference of the inner radial portion of the friction material layer.

7. The clutch plate as recited in claim 1 wherein the outer radial portion of the friction material layer is formed by a single contiguous ring.

8. The clutch plate as recited in claim 1 wherein the friction material layer is formed by two or more arc shaped segments circumferentially spaced from each other to form a ring.

9. The clutch plate as recited in claim 1 further comprising an additional friction material layer, the friction material layer being fixed to a first face of the core plate and the additional friction material layer being fixed to a second face of the core plate opposite the first face.

10. The clutch plate as recited in claim 1 wherein the friction material layer is bonded to the core plate by adhesive.

11. The clutch plate as recited in claim 1 wherein the channels are finger shaped.

12. A torque converter comprising:
    the clutch plate as recited in claim 1; and
    a piston for pressing against the inner radial portion of the clutch plate without contacting the outer radial portion, an outer radial edge of the piston being aligned with the outer radial portion of the clutch plate allowing for clearance at an outer radial edge of the piston so the outer radial edge does not cut into the friction material layer as the piston is pressed against the clutch plate.

13. A method for forming a clutch plate comprising:
    attaching a friction material layer to a core plate, the friction material layer defining radially extending channels extending from an inner circumferential surface of the friction material layer into the friction material layer; and
    compressing the friction material layer at outer radial ends of the channels such that the friction material layer includes an inner radial portion of a first thickness and an outer radial portion of a second thickness less than the first thickness, the radially extending channels extending from an inner circumference of the inner radial portion to the outer radial portion, the friction material layer including a ring of segments of the inner radial portion interrupted by the radially extending channels, the core plate being uncovered by the friction material layer and being exposed at the radially extending channels, the outer radial portion being formed as a continuous ring with the segments of inner radial portion being integrally formed with the continuous ring and extending radially therefrom or the outer radial portion being formed as two or more segments with at least one of the segments of the inner radial portion being integrally formed with and extending radially inward from each of the segments of the outer radial portion.

14. The method as recited in claim 13 wherein the compressing the friction material layer at outer radial ends of the channels allows the channels to define a fluid flow path from an inner circumference of the friction material layer to an outer circumference of the friction material layer.

15. The method as recited in claim 13 wherein the compressing step includes pressing a ring shaped die against an outer radial portion of the friction material layer.

16. The method as recited in claim 15 wherein the attaching the friction material layer to the core plate includes bonding the friction material layer to the core plate with adhesive, the bonding being performed during the pressing the ring shaped die against the outer radial portion of the friction segment.

17. The method as recited in claim 13 further comprising attaching an additional friction material layer to a core plate on an opposite face of the core plate as the friction material layer, the additional friction material layer including radially extending channels defined therein extending from an inner circumferential surface of the additional friction material layer into the additional friction material layer; and compressing the additional friction material layer at outer radial ends of the channels.

18. The method as recited in claim 13 wherein the friction material layer has a constant thickness before the compressing step.

19. The method as recited in claim 13 wherein the outer radial portion of the friction material layer is formed by a single contiguous ring or two or more arc shaped segments circumferential spaced from each other to form a ring.

20. The method as recited in claim 13 wherein the friction material layer is formed by two or more arc shaped segments circumferentially spaced from each other to form a ring.

\* \* \* \* \*